3,287,211
CONTROLLING MITES WITH CERTAIN ALKYL-
(2,4-DINITROPHENYL) CARBONATES
Karoly Szabo, Orinda, and Jack P. Orr, Mountain View,
Calif., assignors to Stauffer Chemical Company, New
York, N.Y., a corporation of Delaware
No Drawing. Filed Feb. 26, 1965, Ser. No. 435,679
3 Claims. (Cl. 167—30)

This invention relates to certain compounds which may be used as acaricides. More specifically, the invention relates to the use of compounds of the general formula

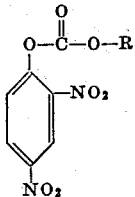

wherein R is lower alkyl, containing from 1 to 10 carbon atoms, inclusive.

These compounds have been found to be useful and particularly effective against mite organisms belonging to the class acarina. The term mites is used herein to include both mites and ticks, which are related biologically and are included in the taxonomy acarina. Mites are a serious problem in agriculture and horticulture. Mites are widely distributed throughout the world, and in the United States they are known to attack a wide variety of plants, poultry and livestock. Few other pests cause greater damage to so wide a range of hosts as do mites.

A considerable assortment of acaricidal materials have been suggested and investigated for the control of the mite organisms. Among the organic biocides found effective in controlling a great variety of pest organisms are the organophosphorous compounds. The organophosphorous esters have proven exceptionally effective for destroying insects. Several of the commercial insecticides which are currently being manufactured and employed for this purpose include as the toxic ingredient one or more of the organophosphorous esters. Although the newly developed insecticides give excellent protection against insects, certain other pest organisms have proved more difficult to control. For example, certain species of the phytophagous mites of the class acarina have exhibited an unusual degree of resistance to many of the commonly used insecticides. It is also known that certain organisms are capable of developing resistance to certain classes for insecticides and acaricides; especially to be noted are the organophosphorous materials. Therefore, there exists a continuing search for new materials to control the aforementioned pests, wherein the capability to establish resistance is decreased and satisfactory control can be realized.

It has been discovered that certain alkyl-(2,4-dinitrophenyl) carbonates are especially effective in the control of acarids and the provision of a method for combating said pest organisms by means of said carbonates constitutes the principal object of this invention. Yet further objects will become apparent throughout the balance of the invention.

Generally, the compounds within the embodiment of the present invention may be prepared by the reaction of the appropriate alkyl chloroformate and 2,4-dinitrophenol in the presence of a base catalyst such as triethylamine. Typically, the following example illustrates the preparation.

EXAMPLE

*Preparation of n-octyl-(2,4-dinitrophenyl) carbonate.*—
N-octylchloroformate (19.3 g.), 100 ml. of benzene and 2,4-dinitrophenol (18.4 g.) were placed in a three-necked flask equipped with a mechanical stirrer, reflux condenser and dropping funnel. Triethylamine (10.1 g.) was gradually added with stirring. A spontaneous reaction took place accompanied by the precipitation of the triethylamine-hydrochloride. When addition of the base was completed the mixture was refluxed for about 30 minutes. The reaction mixture was allowed to cool and then filtered. The filtrate was washed with small amounts of water, 5 percent aqueous sodium carbonate solution and water again in succession. After drying the organic phase over anhydrous magnesium sulfate, the volatile components were removed in vacuo. There was obtained 30.7 grams of a pale yellow oil, $n_D^{21}=1.5080$. Analysis was in agreement with the expected structure of the title compound.

In practising the present invention any of the various techniques or methods can be employed for contacting the mites with the toxic carbonate compounds. For example, spray formulations can be prepared by dissolving the carbonate in suitable organic solvent such as toluene, xylene, benzene and the like, and subsequent dispersion of this solution in water in the presence of a surface active wetting or emulsifying agent. Another method by which the acaricidal agents of the present invention can be applied is in the form of dispersible powders, preferably as homogeneous free-flowing dusts commonly formulated by mixing the active component with finely divided solids or carriers such as talc, natural clays, diatomaceous earth, various flours such as walnut shell, wheat and the like. The details of compounding and application are well known to those skilled in the art.

The compounds of the present invention were tested as acaricides according to the following methods.

*Acaricidal evaluation test.*—The two-spotted mite, *Tetranychus telarius* (Linn.), was employed in the tests for acaricidal activity. Young pinto bean plants in the primary leaf stage were used as host plants. The young pinto bean plants were infested with several hundred mites. Dispersions of the candidate materials were prepared by dissolving 0.1 gram in 10 ml. of a suitable solvent, usually acetone. Aliquots of the toxicant solutions were suspended in water containing 0.0175% v./v. Sponto 221 ®, a commercial emulsifying agent. The amount of water used was sufficient to give concentrations of active ingredient ranging from 0.25% to 0.0005%. The test suspensions were then sprayed on the infested pinto bean plants. After seven days mortality of post-embryonic and egg forms were determined. The percentage of kill was determined by comparison with control plants which had not been sprayed with the candidate compounds. The LC–50 value was calculated using well-known procedures.

The compound n-octyl-(2,4-dinitrophenyl)-carbonate ($n_D^{25}=1.5080$), when applied in the above-described test, offered effective control of the two-spotted mite test species in the post-embryonic form at an LC–50 of 0.005%. This compound was also suitable for control of the egg form of the mite at an LC–50 of 0.03%.

Plants infested with the test mite and treated with the compound n-butyl-(2,4 - dinitrophenyl)-carbonate (melting at 47° C.) in the aforedescribed manner controlled the test species in the post-embryonic stage at an LC–50 of 0.005%.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of controlling mites comprising applying thereto an effective amount of a compound of the formula

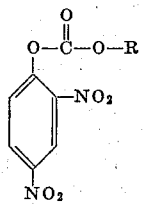

wherein R is lower alkyl, containing from 1 to 10 carbon atoms, inclusive.

2. The method of controlling mites comprising applying thereto an effective amount of the compound n-butyl-(2,4-dinitrophenyl)-carbonate.

3. The method of controlling mites comprising applying thereto an effective amount of the compound n-octyl-(2,4-dinitrophenyl)-carbonate.

References Cited by the Examiner

UNITED STATES PATENTS

| | | | |
|---|---|---|---|
| 2,384,306 | 9/1945 | Hester et al. | 167—30 |
| 2,905,706 | 9/1959 | Sims et al. | 260—471 |
| 2,917,534 | 12/1959 | Sims et al. | 260—463 |
| 3,120,554 | 2/1964 | Baker et al. | 260—463 |
| 3,123,522 | 3/1964 | Scherer et al. | 167—30 |
| 3,124,607 | 3/1964 | Schisla | 260—463 |
| 3,130,037 | 4/1964 | Scherer et al. | 71—2.6 |
| 3,198,824 | 8/1965 | Van den Boogaart | 260—463 |
| 3,234,082 | 2/1966 | Pianka et al. | 167—30 |
| 3,234,260 | 2/1966 | Pianka et al. | 260—463 |

OTHER REFERENCES

Eddy: J. Econ. Entomol 41: 31–36 (1948).

LEWIS GOTTS, *Primary Examiner.*

SHEP K. ROSE, *Assistant Examiner.*